(12) United States Patent
Lugert et al.

(10) Patent No.: US 11,653,813 B2
(45) Date of Patent: May 23, 2023

(54) DOMESTIC DISHWASHER

(71) Applicant: BSH Hausgeräte GmbH, Munich (DE)

(72) Inventors: Michael Lugert, Jettingen-Scheppach (DE); Bernd Eisenbart, Holzheim (DE); Werner Oblinger, Mödingen (DE)

(73) Assignee: BSH Hausgeräte GmbH, Munich (DE)

( * ) Notice: Subject to any disclaimer, the term of this patent is extended or adjusted under 35 U.S.C. 154(b) by 143 days.

(21) Appl. No.: 17/427,933

(22) PCT Filed: Jul. 16, 2020

(86) PCT No.: PCT/EP2020/070111
§ 371 (c)(1),
(2) Date: Aug. 3, 2021

(87) PCT Pub. No.: WO2021/018612
PCT Pub. Date: Feb. 4, 2021

(65) Prior Publication Data
US 2022/0047144 A1    Feb. 17, 2022

(30) Foreign Application Priority Data
Jul. 31, 2019   (DE) .................... 10 2019 211 429.6

(51) Int. Cl.
*A47L 15/00* (2006.01)
*A47L 15/22* (2006.01)
*F16D 7/04* (2006.01)

(52) U.S. Cl.
CPC .......... *A47L 15/0049* (2013.01); *A47L 15/22* (2013.01); *F16D 7/044* (2013.01); *F16D 7/048* (2013.01);

(Continued)

(58) Field of Classification Search
None
See application file for complete search history.

(56) References Cited

U.S. PATENT DOCUMENTS 9,198,556 B2 * 12/2015 Allen .................. A47L 15/4289
2010/0212692 A1    8/2010 Sundaram
(Continued)

FOREIGN PATENT DOCUMENTS

| CN | 104284620 A | 1/2015 |
| CN | 104523208 A | 4/2015 |

(Continued)

OTHER PUBLICATIONS

National Search Report DE 10 2019211 429.6 dated Apr. 15, 2020.
International Search Report PCT/EP2020/070111 dated Sep. 22, 2020.

*Primary Examiner* — Rita P Adhlakha
(74) *Attorney, Agent, or Firm* — Michael E. Tschupp; Andre Pallapies; Brandon G. Braun

(57) ABSTRACT

A household dishwasher includes a washing container receiving a dishwasher load, a spray arm for applying washing liquor and/or fresh water to the dishwasher load, a drive system for actively driving the spray arm, and an overload protection mechanism configured to move autonomously from a coupling position, in which power is transmitted between the drive system and the spray arm, into a decoupling position, in which the power transmission between the drive system and the spray arm is interrupted, when the spray arm becomes blocked.

30 Claims, 13 Drawing Sheets

(52) U.S. Cl.
CPC ....... *A47L 2401/24* (2013.01); *A47L 2501/20* (2013.01); *F16D 2300/18* (2013.01)

(56) References Cited

U.S. PATENT DOCUMENTS

| | | |
|---|---|---|
| 2011/0146733 A1 | 6/2011 | Fountain |
| 2014/0069462 A1 | 3/2014 | Becker |

FOREIGN PATENT DOCUMENTS

| | | | |
|---|---|---|---|
| CN | 206408407 U | 8/2017 | |
| DE | 102009042867 A1 | 4/2011 | |
| EP | 2233057 A1 | 9/2010 | |
| EP | 2931107 A1 | 10/2015 | |
| WO | 2013132459 A1 | 9/2013 | |
| WO | 2015149860 A1 | 10/2015 | |
| WO | WO-2020043285 A1 * | 3/2020 | ......... A47L 15/0049 |

* cited by examiner

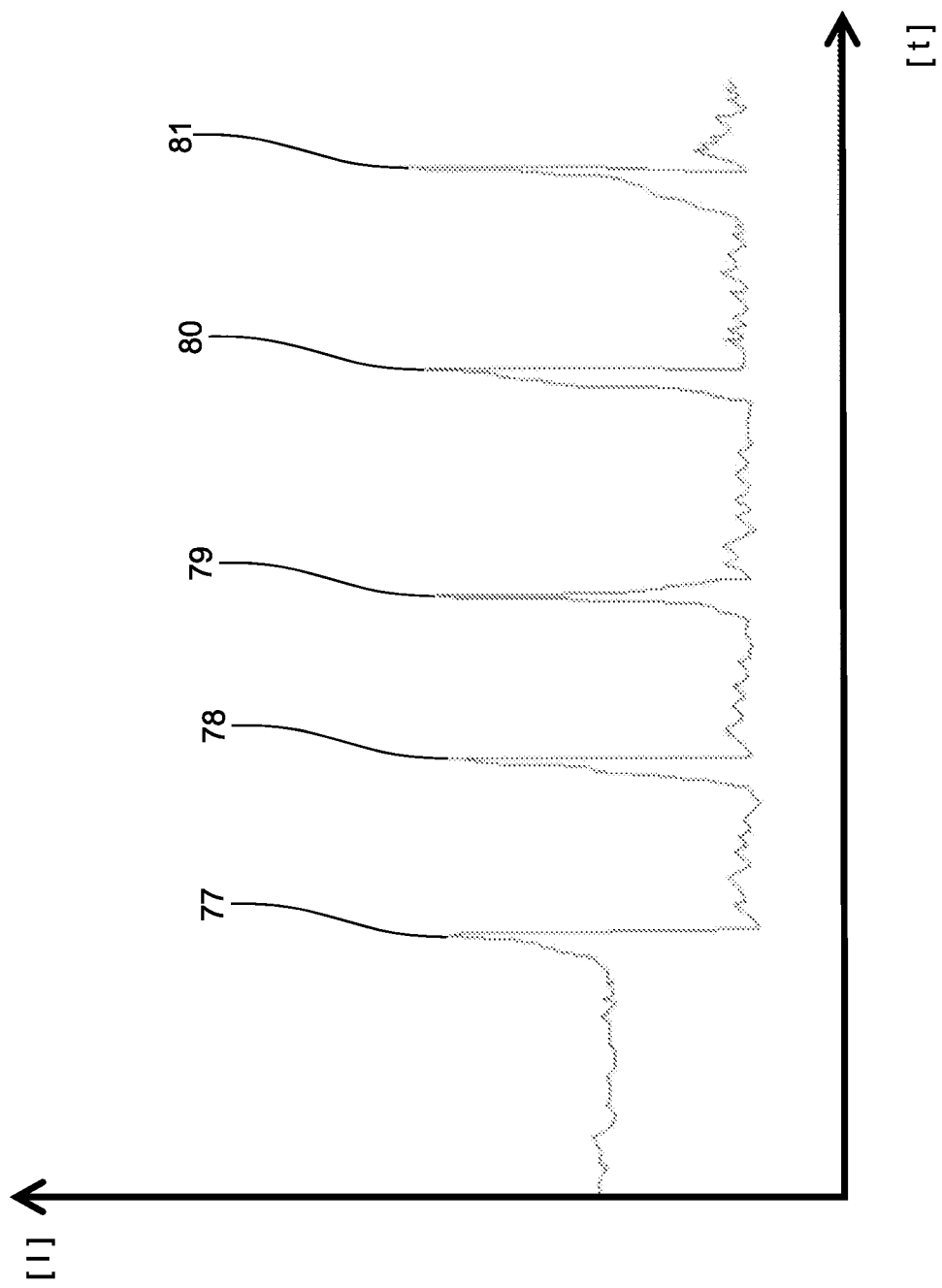

DOMESTIC DISHWASHER

CROSS-REFERENCES TO RELATED APPLICATIONS

This application is the U.S. National Stage of International Application No. PCT/EP2020/070111, filed Jul. 16, 2020, which designated the United States and has been published as International Publication No. WO 2021/018612 A1 and which claims the priority of German Patent Application, Serial No. 10 2019 211 429.6, filed Jul. 31, 2019, pursuant to 35 U.S.C. 119(a)-(d).

BACKGROUND OF THE INVENTION

The present invention relates to a household dishwasher.

A dishwasher comprises a washing container in which a dishwasher load to be cleaned can be received. To apply washing liquor and/or fresh water to the dishwasher load, a rotating spray arm can be provided within the washing container. This spray arm can be driven either with the aid of the pressure of washing liquor and/or fresh water emerging from spray nozzles of the spray arm or with the aid of an active drive, in particular with the aid of an electric motor. If an active drive is provided, a blockage of the spray arm can result in the drive being overloaded. In addition, actions with the spray arm or actions in the washing container can result in a force being exerted on the spray arm which can likewise lead to overloading. Both cases should be prevented.

BRIEF SUMMARY OF THE INVENTION

Against this background, it is an object of the present invention to provide an improved household dishwasher.

Accordingly, a household dishwasher with a washing container, a spray arm for applying washing liquor and/or fresh water to the dishwasher load received in the washing container, a drive system for actively driving the spray arm and an overload protection mechanism is proposed. If the spray arm becomes blocked, the overload protection mechanism moves autonomously from a coupling position, in which power is transmitted between the drive system and the spray arm, into a decoupling position, in which the power transmission between the drive system and the spray arm is interrupted.

The provision of the overload protection mechanism reliably prevents overloading of the drive system. This in particular prevents damage to a drive element of the drive system or of a gear of the drive system.

The washing container is preferably cuboidal. In particular, the washing container comprises a floor, a top arranged opposite the floor, a door, a rear wall arranged opposite the closed door and two side walls. Dishwasher load receptacles for receiving the dishwasher load can be provided in the washing container. For example, an upper basket, a lower basket and a cutlery drawer are provided. The spray arm can be arranged below the lower basket. The spray arm can in particular be rotatably mounted on the floor. Alternatively, the spray arm can also be arranged between the lower basket and the upper basket.

In the present case, "applying" washing liquor and/or fresh water to the dishwasher load should be understood to mean that the dishwasher load is wetted with washing liquor and/or fresh water with the aid of the spray arm. In the present case, "washing liquor" can be understood to mean water mixed with a detergent. The washing liquor can comprise dirt that becomes detached from the dishwasher load. In the present case, the fact that the spray arm is "actively driven" should be understood to mean that the drive system applies a torque to the spray arm. Therefore, in the present case, "active" driving should in particular not be understood as meaning that the spray arm is set into rotation with the aid of spray nozzles. To actively drive a spray arm, the drive system comprises a drive element, in particular an electric motor, which sets a drive shaft into rotation.

The spray arm in particular comprises an actively driven cross-arm and a spray arm satellite rotatably mounted on the cross-arm. The spray arm satellite is preferably not actively driven but is driven with the aid of washing liquor and/or fresh water emerging from spray nozzles of the spray arm. In the present case, a "blockage" of the spray arm should in particular be understood to mean a blockage of the aforementioned cross-arm. However, "blockage" can also be understood to mean a blockage caused by the dishwasher load due to the application of an external force, for example by a user. The fact that the overload protection mechanism moves "autonomously" from the coupling position into the decoupling position and back should in particular be understood to mean that the overload protection mechanism can be moved from the coupling position into the decoupling position and vice versa without an active drive element and/or sensors. As mentioned above, the drive system preferably comprises the drive element and a plurality of gear wheels that are driven by the drive element. One of the gear wheels is in operative connection with the spray arm, in particular with the cross-arm of the spray arm. For this purpose, the cross-arm can have spray-arm toothing in which one of the gear wheels engages in a form-fitting manner.

According to one embodiment, the overload protection mechanism is spring-biased in the direction of the coupling position.

This should in particular be understood to mean that the overload protection mechanism moves autonomously from the decoupling position into the coupling position. Conversely, this means that the overload protection mechanism can only be moved from the coupling position into the decoupling position against a spring force of a spring element. The spring element in turn moves the overload protection mechanism from the decoupling position back into the coupling position without any external force.

According to a further embodiment, an axis of rotation of a drive shaft of the drive system and an axis of rotation of the spray arm are arranged parallel to one another and spaced apart from one another.

In the present case, the fact that the axis of rotation of the spray arm and the axis of rotation of the drive shaft are arranged "spaced apart from one another" should in particular be understood to mean that the two axes of rotation are arranged at a distance from one another. This means that the axis of rotation of the drive shaft and the axis of rotation of the spray arm in particular do not coincide. Herein, the axis of rotation of the spray arm is identical to an axis of rotation of the cross-arm. This means in particular that the axis of rotation of the drive shaft and the axis of rotation of the cross-arm are parallel to one another and spaced apart from one another.

According to a further embodiment, the overload protection mechanism is received in a gear wheel of the drive system.

This can achieve a particularly compact design. To enable the overload protection mechanism to be received in the gear wheel, the wheel is preferably embodied as hollow and has a receiving region for receiving the overload protection mechanism.

According to a further embodiment, the overload protection mechanism comprises an overload element, which, for power transmission between the drive system and the spray arm, is engaged in a force-fitting and/or form-fitting manner with a counter-engagement section of the gear wheel, wherein, if the spray arm becomes blocked, the overload element leaves the force-fitting and/or form-fitting engagement with the counter-engagement section in order to move the overload protection mechanism from the coupling position into the decoupling position.

A form-fitting connection is created by at least two connection partners engaging in or behind one another. A force-fitting connection requires a normal force on the surfaces to be connected. Force-fitting connections can be realized by friction locking. Mutual displacement of the surfaces is prevented as long as the counterforce caused by the static friction is not exceeded. The counter-engagement section and the overload element have corresponding control surfaces that can slide on one another with friction. The engagement of the overload element in or with the counter-engagement section can be purely force-fitting, purely form-fitting or both force-fitting and form-fitting. The overload element preferably comprises an engagement section with the aforementioned control surfaces, wherein the engagement section can engage in the counter-engagement section. The counter-engagement section has control surfaces corresponding to the control surfaces of the engagement section.

According to a further embodiment, if the spray arm becomes blocked, the overload element moves linearly along an axis of rotation of the gear wheel in order to move the overload protection mechanism from the coupling position into the decoupling position.

The axis of rotation of the gear wheel preferably corresponds to the aforementioned axis of rotation of the drive shaft of the drive element of the drive system. When the overload protection mechanism is moved from the decoupling position into the coupling position, the overload element likewise moves linearly along the axis of rotation.

According to a further embodiment, the overload protection mechanism comprises a housing element connected to the overload element, wherein a spring element is arranged between the overload element and the housing element.

The spring element is in particular a cylindrical spring. The spring element is preferably a compression spring. The housing element and the overload element are preferably embodied in a pot shape. Herein, the housing element can, at least in sections, be received in the overload element. The housing element is preferably connected to the overload element in a form-fitting manner. Latching hooks or snap hooks can be provided for this purpose.

According to a further embodiment, when the overload protection mechanism is moved from the coupling position into the decoupling position, the spring element moves the overload element linearly along the axis of rotation of the gear wheel with respect to the housing element.

For this purpose, corresponding guides can be provided on the overload element and on the housing element, for example in the form of grooves and ribs.

According to a further embodiment, the spring element is, at least in sections, received in the overload element.

The spring element can also, at least in sections, be received in the housing element.

According to a further embodiment, if the spray arm becomes blocked, the overload element moves linearly perpendicular to an axis of rotation of the gear wheel in order to move the overload protection mechanism from the coupling position into the decoupling position.

As mentioned above, the axis of rotation of the gear wheel is preferably identical to the axis of rotation of the drive shaft of the drive element of the drive system. The perpendicular movement along the axis of rotation enables a particularly compact construction of the overload protection mechanism to be achieved.

According to a further embodiment, the overload protection mechanism comprises a housing element received in the gear wheel, wherein a spring element is arranged between the housing element and the overload element.

The housing element is preferably cylindrical. The housing element is received in the gear wheel. The overload element is in turn received in the housing element.

According to a further embodiment, when the overload protection mechanism is moved from the coupling position into the decoupling position, the spring element moves the overload element linearly perpendicular to the axis of rotation of the gear wheel with respect to the housing element.

Preferably, a receiving section is provided in the housing element in which the overload element is received. Furthermore, a guide section is provided in which a guide pin of the overload element is linearly guided. This prevents the overload element from tilting.

According to a further embodiment, the overload element is, at least in sections, received in the spring element.

In particular, the spring element is received in the housing element. Preferably a, in particular cylindrical, base section of the overload element is received in the spring element.

According to a further embodiment, the household dishwasher furthermore comprises a detection system which can be used to detect whether the overload protection mechanism is in the coupling position or the decoupling position.

This enables a user to be informed as to whether or not the overload protection mechanism has tripped. Moving from the coupling position into the decoupling position can be referred to as "tripping" of the overload protection mechanism. The user can take appropriate measures and, for example, remove the dishwasher load responsible for the blockage.

According to a further embodiment, the detection system detects a motor current of the drive system.

In particular, the detection system detects an increase in the motor current that occurs on the tripping of the overload protection mechanism, i.e. when the overload protection mechanism is moved from the coupling position into the decoupling position. For example, following the detection of, for example, five increases in the motor current, information can be output that the spray arm is blocked and a measure is to be taken, such as, for example, the removal of the dishwasher load responsible for the blockage.

Further possible implementations of the household dishwasher also comprise combinations, not explicitly named, of features or embodiments described above or below with reference to the exemplary embodiments. Herein, the person skilled in the art will also add individual aspects as improvements or additions to the respective basic form of the household dishwasher.

BRIEF DESCRIPTION OF THE DRAWINGS

Further advantageous embodiments and aspects of the household dishwasher are the subject matter of the sub-claims and the exemplary embodiments of the household dishwasher described below. In addition, the household dishwasher is described in more detail with reference to preferred embodiments and with reference to the attached figures.

FIG. 13 shows a schematic diagram in which the motor current of the drive system according to FIG. 3 and FIG. 8 is plotted over time.

DETAILED DESCRIPTION OF EXEMPLARY EMBODIMENTS OF THE PRESENT INVENTION

Figure 1:
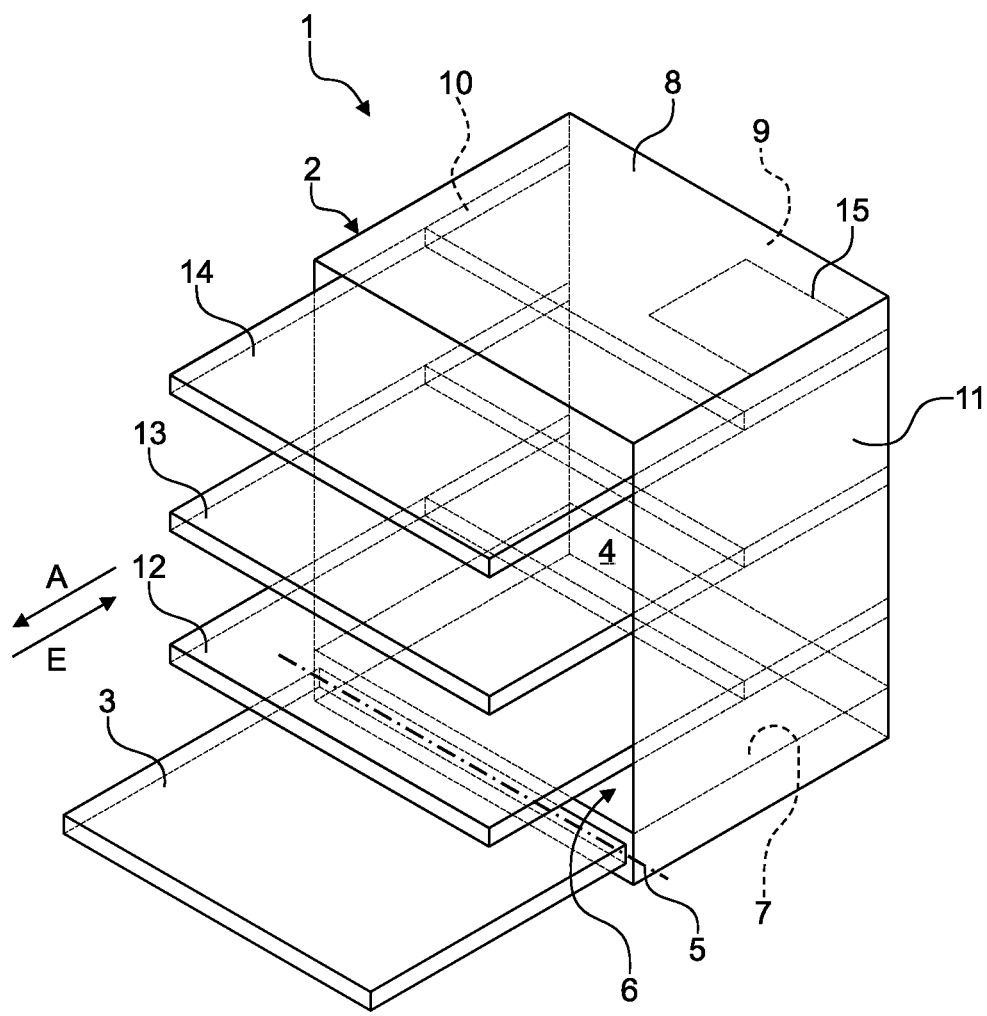
FIG. 1 shows a schematic perspective view of an embodiment of a household dishwasher.

Unless specified otherwise, in the figures, the same elements or elements having similar functions are given the same reference characters.

FIG. 1 shows a schematic perspective view of an embodiment of a household dishwasher 1. The household dishwasher 1 comprises a washing container 2, which can be closed by a door 3, in particular in a watertight manner. For this purpose, a sealing system can be provided between the door 3 and the washing container 2. The washing container 2 is preferably cuboidal. The washing container 2 can be arranged in a housing of the household dishwasher 1. The washing container 2 and the door 3 can form a washing chamber 4 for washing dishwasher loads.

In FIG. 1, the door 3 is depicted in its open position. The door 3 can be closed or opened by pivoting about a pivot axis 5 provided at a lower end of the door 3. The door 3 can be used to close or open a loading opening 6 of the washing container 2. The washing container 2 has a floor 7, a top 8 arranged opposite the floor 7, a rear wall 8 arranged opposite the closed door 3 and two side walls 10, 11 arranged opposite one another. The floor 7, the top 8, the rear wall 9 and the side walls 10, 11 can, for example, be made of a stainless steel sheet. Alternatively, the floor 7 can, for example, be made of a plastic material.

The household dishwasher 1 furthermore has at least one dishwasher load receptacle 12 to 14. Preferably a plurality of, for example three, dishwasher load receptacles 12 to 14 can be provided, wherein the dishwasher load receptacle 12 can be a lower dishwasher load receptacle or a lower basket, the dishwasher load receptacle 13 can be an upper dishwasher load receptacle or an upper basket and the dishwasher load receptacle 14 can be a cutlery drawer. As FIG. 1 furthermore shows, the dishwasher load receptacles 12 to 14 are arranged one above the other in the washing container 2. Each dishwasher load receptacle 12 to 14 can optionally be moved into or out of the washing container 2. In particular each dishwasher load receptacle 12 to 14 can be pushed or moved into the washing container 2 in an insertion direction E and can be pulled out or moved out of the washing container 2 against the insertion direction E in a pull-out direction A.

The household dishwasher 1 furthermore comprises a detection system 15. The detection system 15 can detect a motor current of a drive system of the household dishwasher 1. The detection system 15 can be part of a control unit of the household dishwasher 1. The control unit is suitable for carrying out a washing program of the household dishwasher 1. For example, multiple washing programs can be stored in the control unit. The control unit can, for example, actuate a circulating pump of the household dishwasher 1. The control unit can be coupled to a display on the household dishwasher 1. The display can, for example, output operating states of the household dishwasher 1 to a user.

Figure 2:
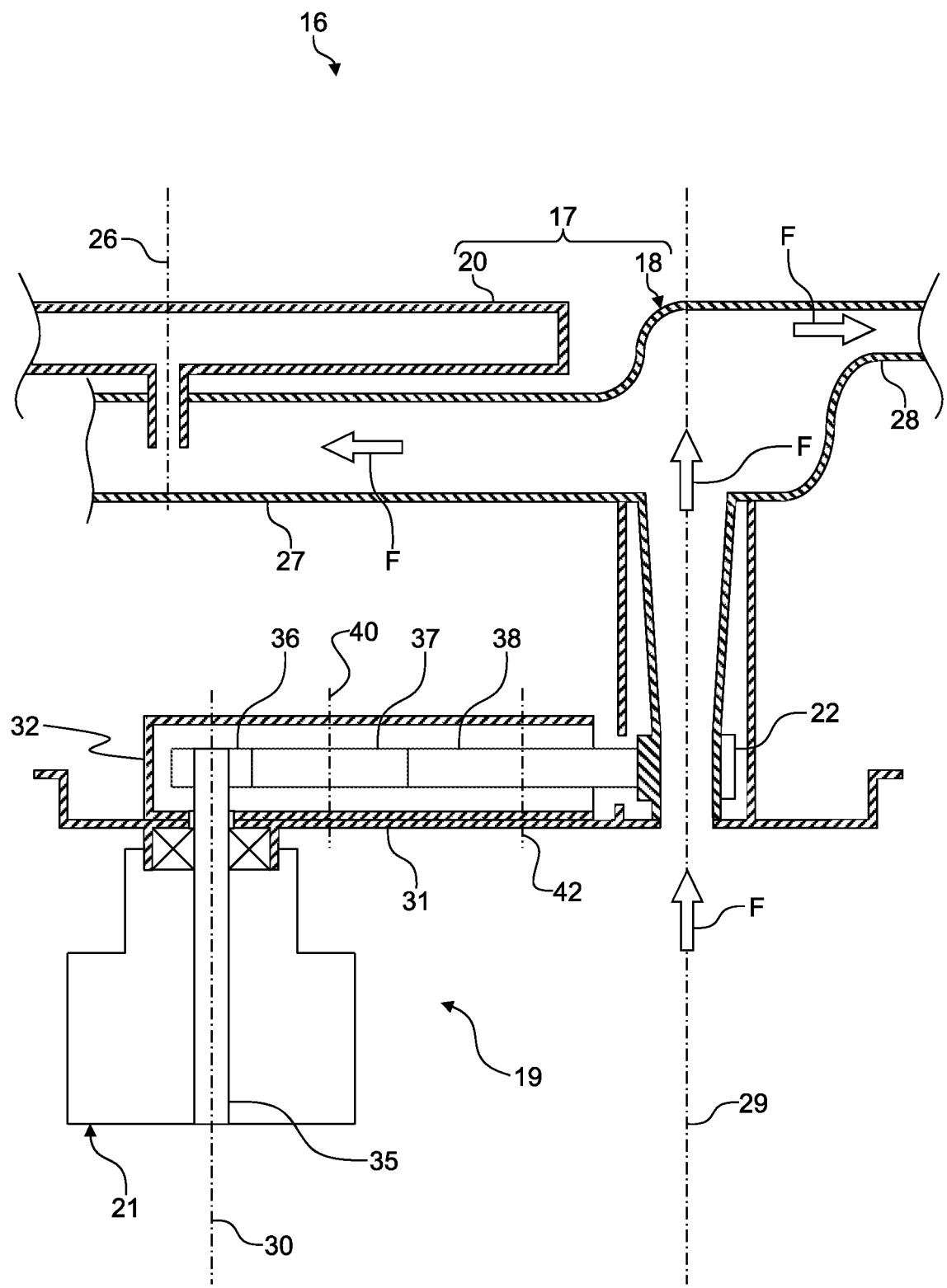
FIG. 2 shows a schematic sectional view of an embodiment of a controlled spray arm or spray system or apparatus for the household dishwasher according to FIG. 1.

FIG. 2 shows a schematic sectional view of an embodiment of a controlled spray arm or spray system or apparatus 16 for the household dishwasher 1. The controlled spray arm 16 is arranged inside the washing container 2. In particular, the controlled spray arm 16 is positioned below the dishwasher load receptacle 12. The controlled spray arm 16 can be positioned on the floor 7. The controlled spray arm 16 comprises a spray arm 17 for applying washing liquor and/or fresh water F to the dishwasher load (not shown) received in the washing container.

The spray arm 17 has a cross-arm 18, which is actively driven with the aid of a drive system 19 and a spray arm satellite 20 rotatably mounted on the cross-arm 18. The spray arm satellite 20 can have a plurality of arms. For example, the spray arm satellite 20 can have three arms arranged offset to one another by an angle of 120°. The spray arm satellite 20 comprises a plurality of spray nozzles. The spray nozzles can be used to apply washing liquor and/or fresh water F to the dishwasher load. The spray arm satellite 20 can also comprise drive spray nozzles with the aid of which the spray arm satellite 20 can be set into rotation.

The spray arm satellite 20 is rotatably mounted about an axis of rotation 26 on the cross-arm 18. The spray arm satellite 20 is not actively driven. This means that the spray arm satellite 20 does not have its own drive system. In particular, the spray arm satellite 20 is reactively driven with the aid of the washing liquor and/or the fresh water F. For this purpose, the drive spray nozzle (not shown) can be provided. In the present case, "reactively driven" should be understood to mean that the spray arm satellite 20 is set into rotation about the axis of rotation 26 by washing liquor and/or the fresh water F emerging from the spray nozzles and/or the drive spray nozzle.

In contrast to the spray arm satellite 20, the cross-arm 18 is actively driven. The drive system 19 is provided for this purpose. The cross-arm 18 comprises a first arm 27 on which the spray arm satellite 20 is rotatably mounted about the axis of rotation 26 and a second arm 28. The arms 27, 28 can have spray nozzles (not shown). However, the arms 27, 28 can also have no spray nozzles. Preferably, two such arms 27, 28 are provided. However, the number of arms 27, 28 is arbitrary. It is also possible for precisely one arm 27, 28 or more than two arms 27, 28 to be provided.

The cross-arm 18 is rotatably mounted about an axis of rotation 29 with the aid of the drive system 19. The axes of rotation 26, 29 are preferably arranged parallel to one another and spaced apart from one another. Both the spray arm satellite 20 and the cross-arm 18 are embodied as hollow so that the washing liquor and/or the fresh water F can flow through the cross-arm 18 and the spray arm satellite 20 and flow out at the spray nozzles or the drive spray nozzle.

The drive system 19 comprises a drive element 21, in particular an electric motor, with a drive shaft 35 which rotates about an axis of rotation 30 when the household dishwasher 1 is in operation. The axes of rotation 29, 30 are arranged parallel to one another and spaced apart from one another. The drive system 19 is fastened to a pump pot 31. The pump pot 31 is fastened on the floor 7. The cross-arm 18 is rotatably mounted about the axis of rotation 29 on the pump pot 31.

Figure 3:
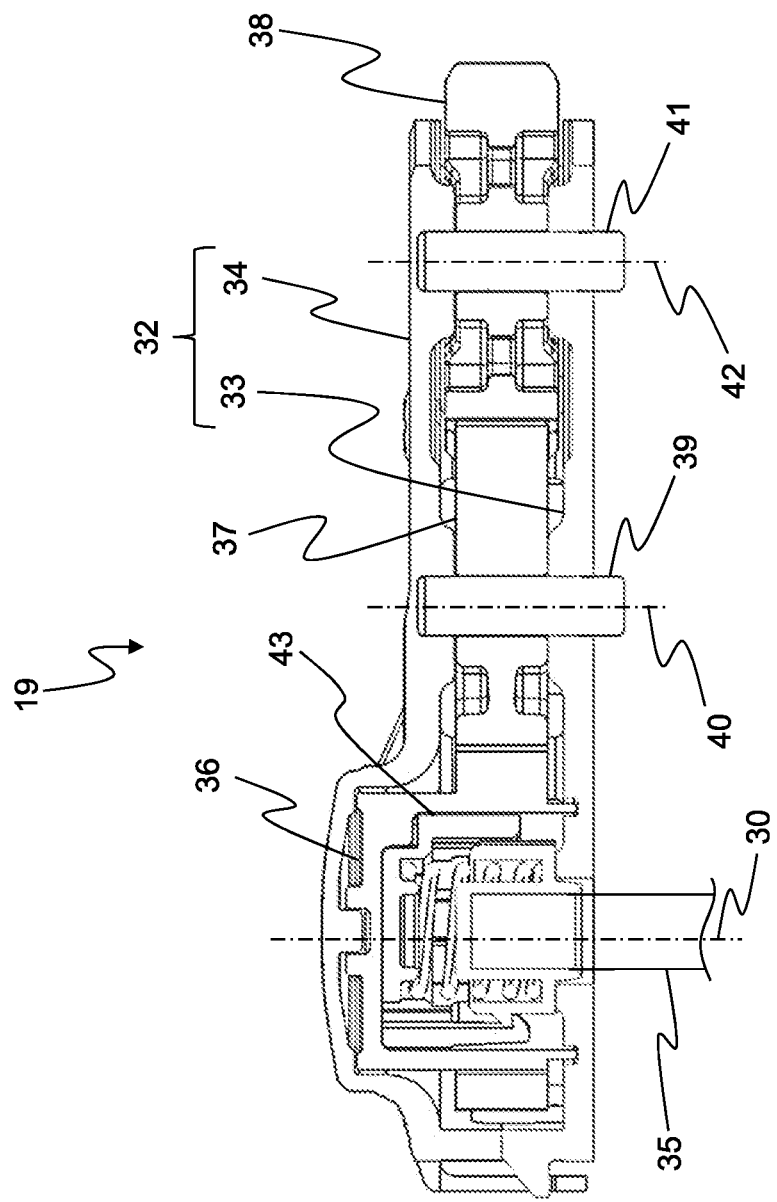
FIG. 3 shows a schematic sectional view of an embodiment of a drive system for the spray apparatus according to FIG. 2.

FIG. 3 shows a schematic sectional view of an embodiment of a drive system 19 as mentioned above. The drive system 19 comprises a gear housing 32 with a lower housing part 33 and an upper housing part 34. The lower housing part 33 and the upper housing part are connected to one another in a form-fitting manner. A form-fitting connection is created by at least two connection partners engaging in or behind one another. Latching hooks or snap hooks with the aid of which the lower housing part 33 and the upper housing part 34 can be connected to one another in a form-fitting manner can be provided on the lower housing part 33 and the upper housing part 34.

As mentioned above, the drive system 19 comprises the drive element 21 with the drive shaft 35 which rotates about the axis of rotation 30. A plurality of mutually engaging gear wheels 36 to 38 are received in the gear housing 32. Preferably, a first gear wheel 36 that is connected to the drive shaft 35 in a rotationally fixed manner is provided. Herein, the axis of rotation 30 is also the axis of rotation of the first gear wheel 36. A second gear wheel 37 is in engagement with the first gear wheel 36. The second gear wheel 37 is rotatably mounted in the gear housing 32 with the aid of an axle 39. The second gear wheel 37 rotates about an axis of rotation 40 in the gear housing 32.

A third gear wheel 38 which is rotatably mounted in the gear housing 32 with the aid of an axle 41 is in engagement with the second gear wheel 37. The axles 39, 41 can be bolts or pins mounted in the gear housing 32. The third gear wheel 38 rotates in the gear housing 32 about an axis of rotation 42. The third gear wheel 38 is in form-fitting engagement with spray-arm toothing 22 (FIG. 2) of the cross-arm 18 in order to set it into rotation. An overload protection mechanism 43 is assigned to the first gear wheel 36.

Figure 4:
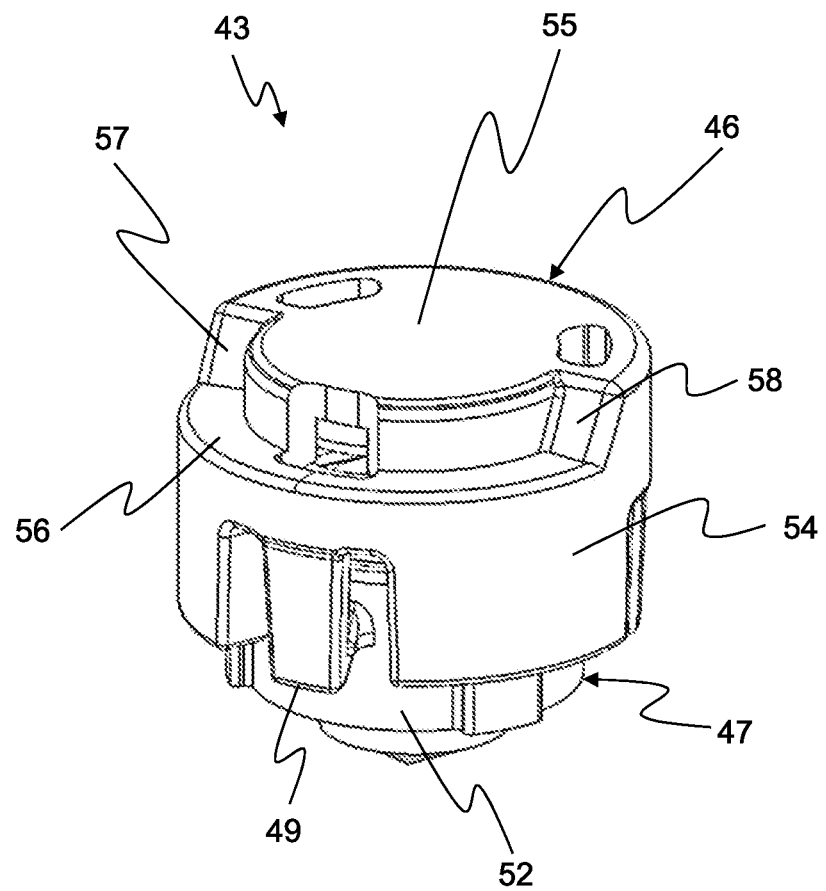
FIG. 4 shows a schematic perspective view of an embodiment of an overload protection mechanism for the drive system according to FIG. 3.
Figure 5:
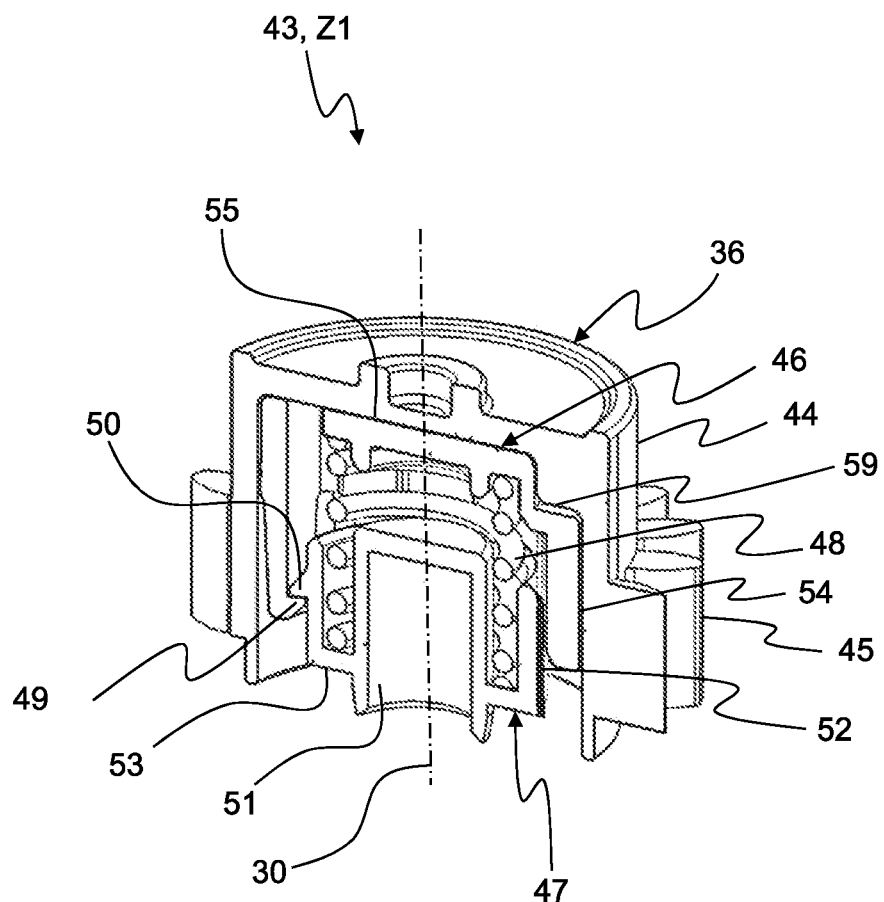
FIG. 5 shows a schematic perspective sectional view of the overload protection mechanism according to FIG. 4.
Figure 6:
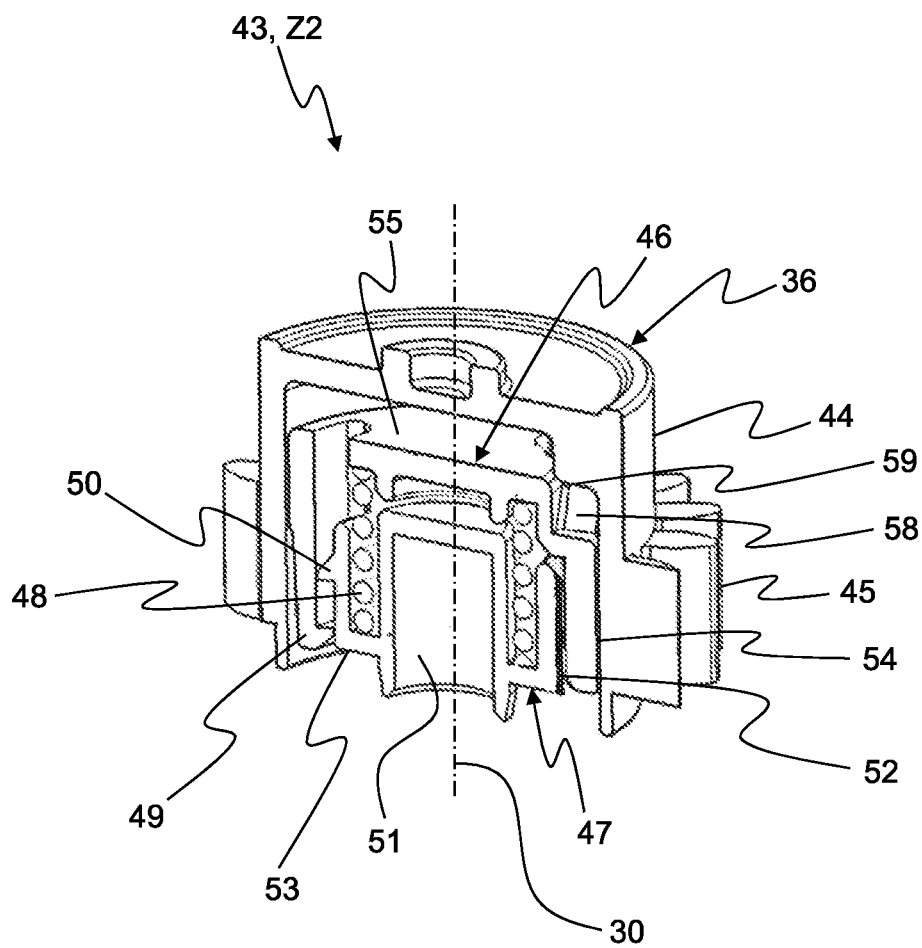
FIG. 6 shows a further schematic perspective sectional view of the overload protection mechanism according to FIG. 4.
Figure 7:
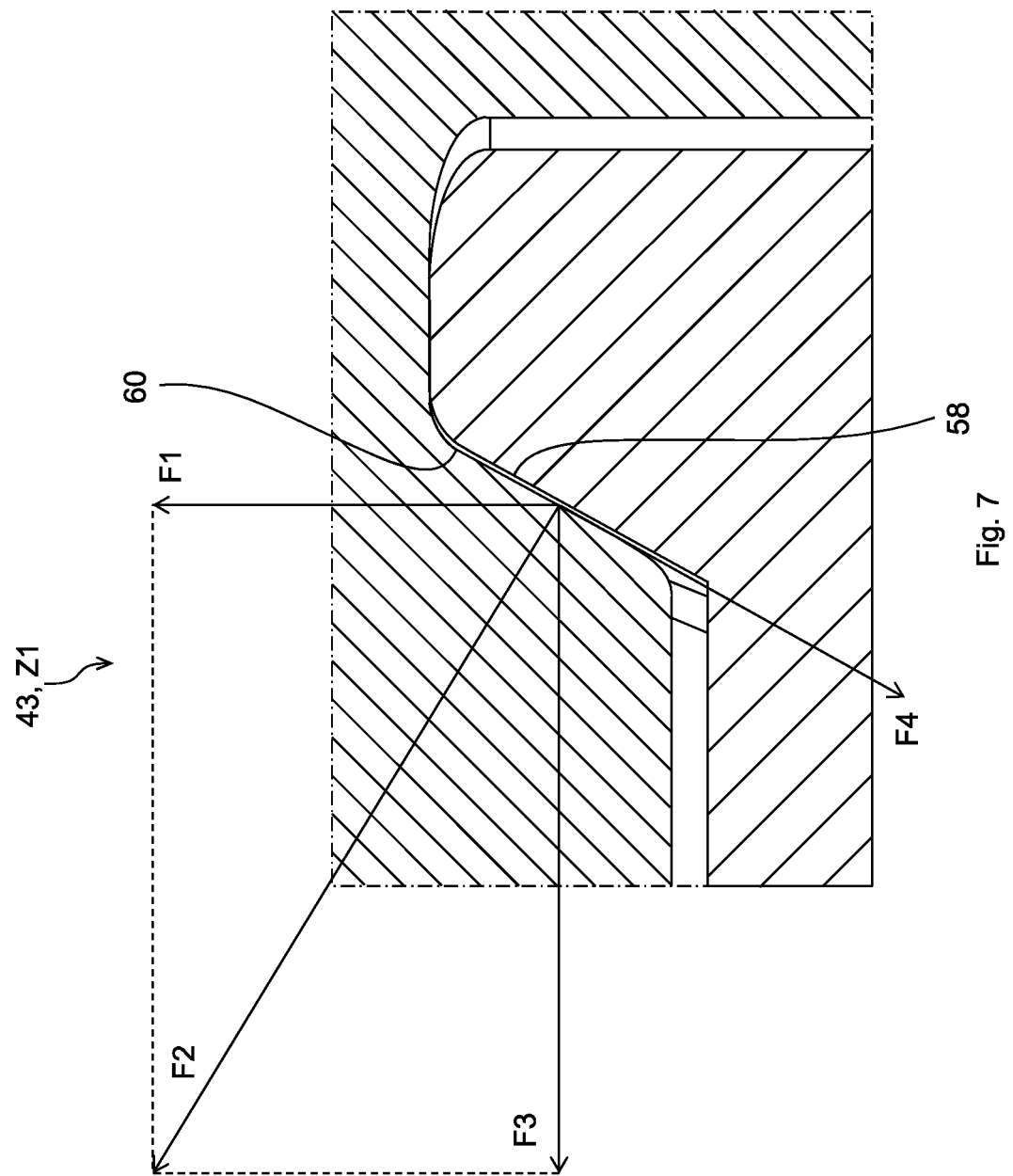
FIG. 7 shows a schematic detailed view of the overload protection mechanism according to FIG. 4.

FIG. 4 shows a schematic perspective view of an embodiment of an overload protection mechanism 43 for the drive system 19 as mentioned above. FIGS. 5 and 6 each show schematic perspective sectional views of the overload protection mechanism 43. FIG. 7 shows a detailed schematic view of the overload protection mechanism 43. The following refers to FIGS. 4 to 7 simultaneously.

In addition to the overload protection mechanism 43, FIGS. 5 and 6 show the first gear wheel 36. The first gear wheel 36 comprises a pot-shaped base section 44 in which the overload protection mechanism 43 is received. Toothing 45 which is in form-fitting engagement with the second gear wheel 37 is provided on the base section 44. The base section 44 serves as a receiving region for the overload protection mechanism 43.

The overload protection mechanism 43 comprises an overload element 46 and a housing element 47. A spring element 48 is provided between the overload element 46 and the housing element 47. The spring element 48 can be a cylindrical spring. The spring element 48 is preferably a compression spring. The overload element 46 and the housing element 47 are connected to one another in a form-fitting manner. For this purpose, snap hooks 49 that are able to latch into corresponding hook-shaped engagement sections 50 of the housing element 47 can, for example, be provided on the overload element 46.

The housing element 47 comprises a receiving section 51 for receiving the drive shaft 35. In the simplest case, the drive shaft 35 can have a lateral flattened or milled area, wherein the receiving section 51 has a geometry corresponding thereto so that the drive shaft 35 is received in the receiving section 51 in a rotationally fixed manner. However, the drive shaft 35 preferably has a multi-tooth profile with a coding. The receiving section 51 is embodied in a corresponding manner. The housing element 47 furthermore comprises a tubular base section 52, connected in one piece, in particular in one piece of material, to the cylindrical receiving section 51. A plate-shaped floor section 53 can be provided for this purpose. The spring element 48 is arranged between the base section 52 and the receiving section 51. Hence, the spring element 48 is at least partially received in the housing element 47.

The spring element 48 is likewise received, at least in sections, in the overload element 46. The overload element 46 comprises a cylindrical base section 54 which is closed at the top by a cover section 55. The overload element 46 furthermore comprises an engagement section 56 with two control surfaces 57, 58 arranged in an inclined manner. The first gear wheel 36 comprises on its base section 44 a counter-engagement section 59 corresponding to the engagement section 56 and which is able to engage in the engagement section 56 in a form-fitting manner. The counter-engagement section 59 comprises control surfaces 60 corresponding to the control surfaces 57, 58 of which only one is shown in FIG. 7.

The functionality of the overload protection mechanism 43 is explained below. If the spray arm, and in particular the cross-arm 18, becomes blocked 17, the drive element 21 continues to rotate the drive shaft 35. In order to prevent the drive element 21 or the gear wheels 36 to 38 being damaged, the overload protection mechanism 43 can be moved from a coupling position Z1 shown in FIG. 5 in which power is transmitted between the drive system 19 and the spray arm 17, in particular the cross-arm 18, into a decoupling position Z2 shown in FIG. 6 in which the power transmission between the drive system 19 and the spray arm 17, in particular the cross-arm 18, is interrupted. Moving the overload protection mechanism 43 from the coupling position Z1 into the decoupling position Z2 can also be referred to as "tripping" the overload protection mechanism 43.

This movement from the coupling position Z1 into the decoupling position Z2 takes place in that the control surfaces 58, 60 slide on one another with friction as a result of which the overload element 46 is moved against a spring bias of the spring element 48 toward the housing element 47. This movement takes place linearly along the axis of rotation 30. If the drive shaft 35 continues to rotate, the spring element 48 autonomously returns the overload protection mechanism 43 from the decoupling position Z2 into the coupling position Z1. If the spray arm 17, and in particular the cross-arm 18, is still blocked, the overload protection mechanism 43 is moved from the coupling position Z1 into the decoupling position Z2 and back on each rotation of the drive shaft 35.

As FIG. 7 shows, a spring force F1 of the spring element 48 acts on the control surfaces 58, 60. A normal force F2 acts perpendicular to the control surfaces 58, 60. A resulting force F3 acts perpendicular to the spring force F1. A friction force F4 acts parallel to the control surfaces 58, 60. The force ratio of the forces F1 to F4 can be varied by a corresponding selection of the spring element 48 so that the overload protection mechanism 43 is optionally tripped earlier or later if the spray arm 17, in particular the cross-arm 18, becomes blocked.

Figure 8:
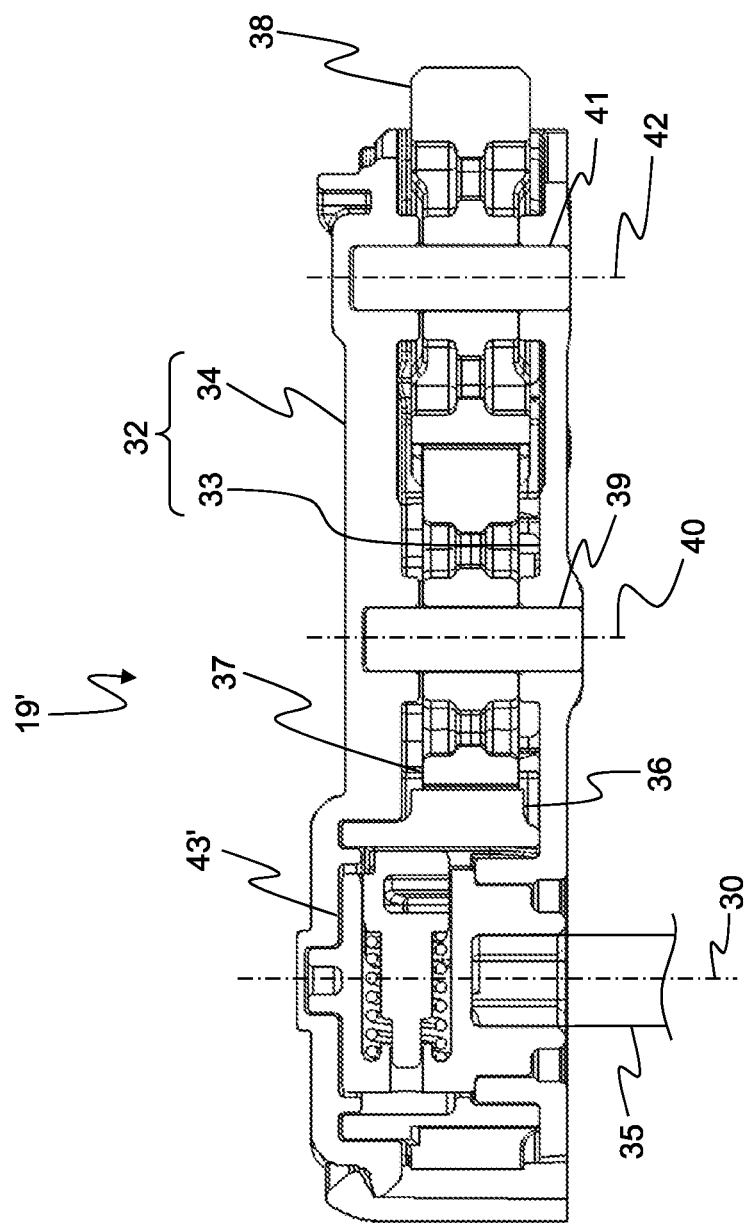
FIG. 8 shows a schematic sectional view of a further embodiment of a drive system for the spray apparatus according to FIG. 2.

FIG. 8 shows a schematic sectional view of a further embodiment of a drive system 19' for the controlled spray arm 16. As already explained with reference to the drive system 19 according to FIG. 3, the drive system 19' comprises a gear housing 32 with a lower housing part 33 and an upper housing part 34. Three gear wheels 36 to 38, in particular a first gear wheel 36, a second gear wheel 37 and a third gear wheel 38, are received in the gear housing 32.

The first gear wheel 36 is operatively connected to a drive shaft 35 of a drive element of the drive system 19' as mentioned above with reference to the drive system 19 and rotates about the axis of rotation 30. An axle 39 is assigned to the second gear wheel 37. The second gear wheel 37 rotates about an axis of rotation 40. An axle 41 is assigned to the third gear wheel 38. The third gear wheel 38 rotates about an axis of rotation. An overload protection mechanism 43' is assigned to the first gear wheel 36. The overload protection mechanism 43' basically has the same functionality as the overload protection mechanism 43 explained above. The drive systems 19, 19' substantially differ in the structural embodiment of the respective overload protection mechanism 43, 43'.

Figure 9:
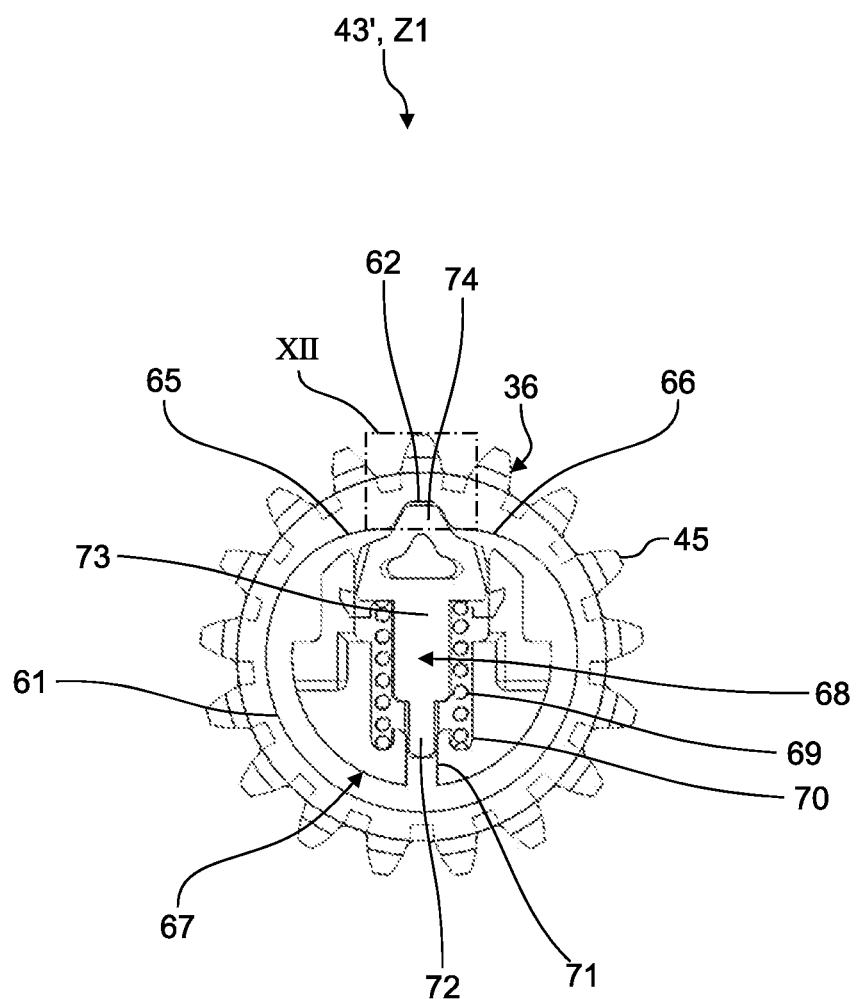
FIG. 9 shows a schematic top view of an embodiment of an overload protection mechanism for the drive system according to FIG. 8.
Figure 10:
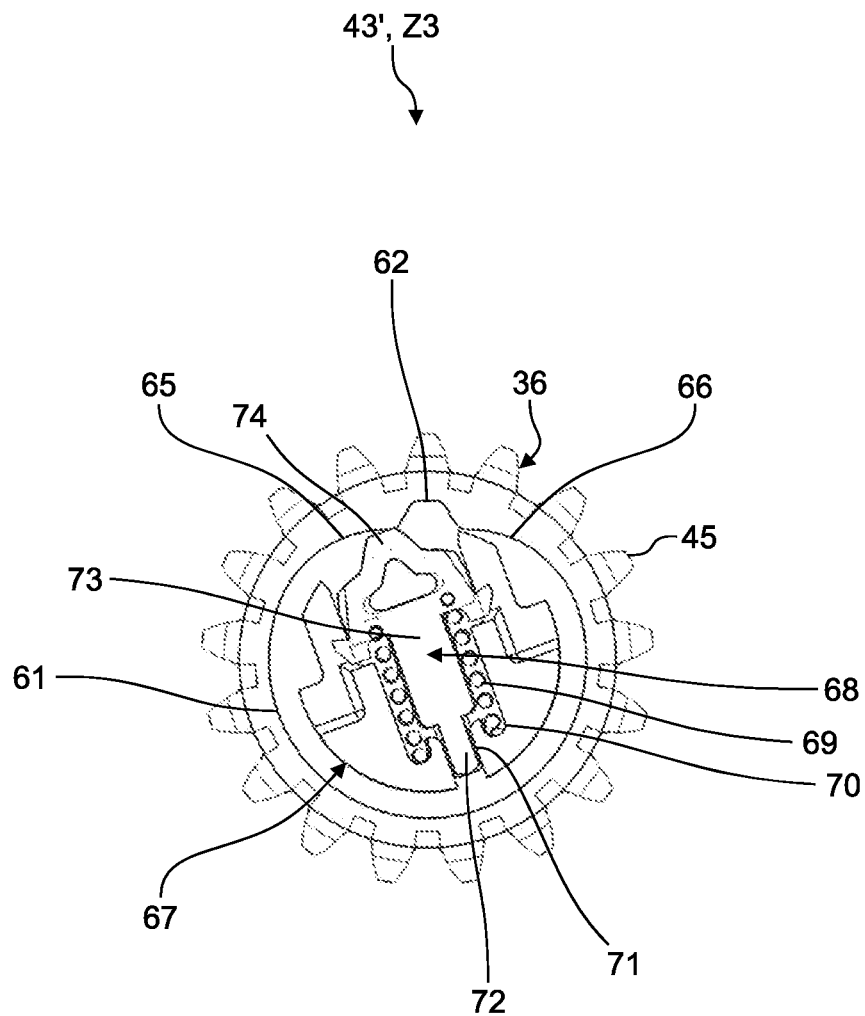
FIG. 10 shows a further schematic top view of the overload protection mechanism according to FIG. 9.
Figure 11:
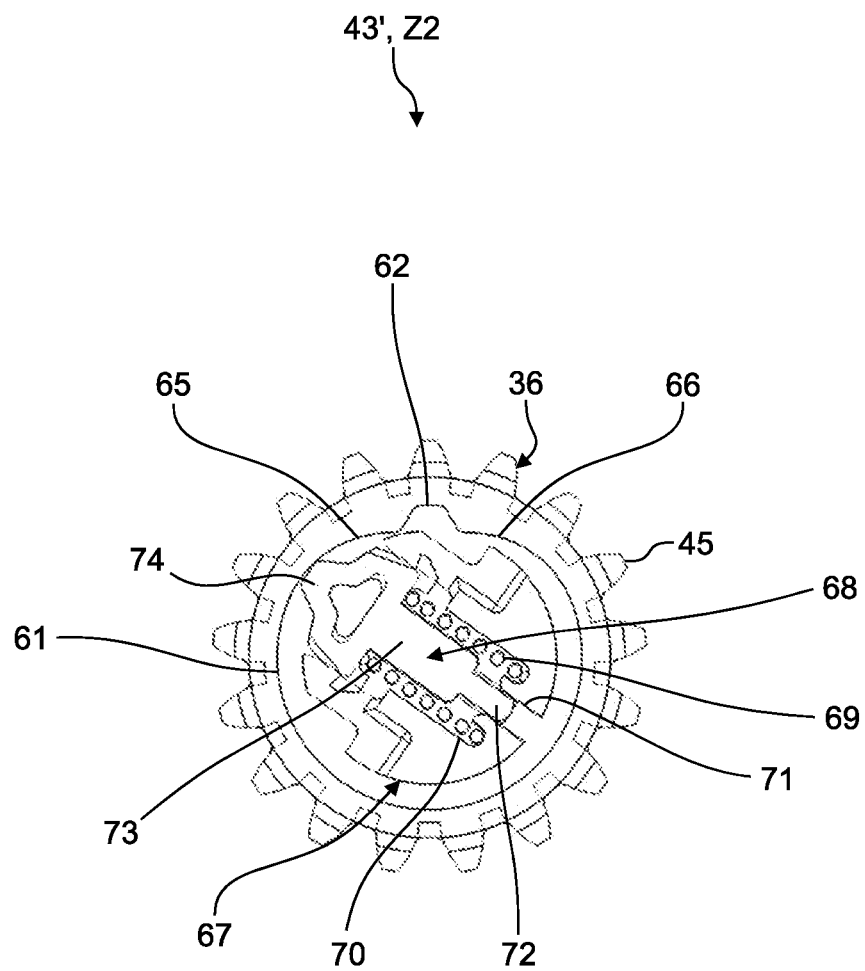
FIG. 11 shows a further schematic top view of the overload protection mechanism according to FIG. 9.
Figure 12:
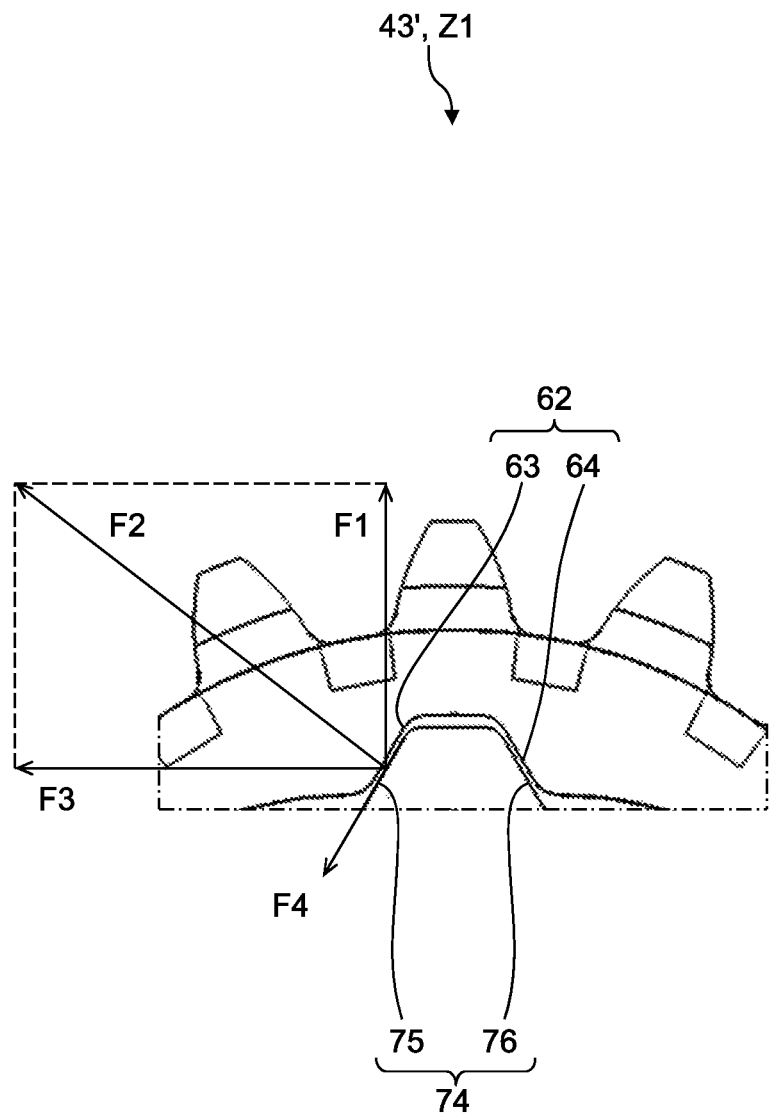
FIG. 12 shows the detailed view XII according to FIG. 9.

FIG. 9 shows a schematic top view of the overload protection mechanism 43' in a coupling position Z1 as explained above. FIG. 10 shows a further schematic top view of the overload protection mechanism 43' in an intermediate state Z3. FIG. 11 shows a top schematic view of the overload protection mechanism 43' in a decoupled position Z2 as explained above. FIG. 12 shows the detailed view XII according to FIG. 9. The following refers to FIGS. 9 to 12 simultaneously.

As already explained above with reference to the drive system 19, the first gear wheel 36 comprises toothing 45 which is in engagement with the second gear wheel 37. On its inner side, the first gear wheel 36 comprises an inner contour 61 with a groove-shaped counter-engagement section 62. The counter-engagement section 62 has two control surfaces 63, 64 (FIG. 12). The inner contour 61 is circular in section, but has two flattened areas 65, 66 of the circular geometry of the inner contour 61 adjacent to the counter-engagement section 62. The overload protection mechanism 43' comprises a housing element 67 rotatably received in the first gear wheel 36. An overload element 68 and a spring element 69 are received in the housing element 67. Herein, the overload element 68 is received in the spring element 69, at least in sections. The spring element 69 can be a cylindrical spring. The spring element 69 is in particular a compression spring.

The housing element 67 comprises a receiving section 70 in which the spring element 69 and the overload element 68 are received. A guide section 71 with the aid of which the overload element 68 is guided linearly in the housing element 67 perpendicular to the axis of rotation 30 adjoins the receiving section 70. For this purpose, a guide pin 72 is provided on the overload element 68. The overload element 68 furthermore comprises a base section 73 received in the spring element 69. The base section 73 can be cylindrical.

An engagement section 74 adjoins the base section 73. The engagement section 74 is suitable for engaging in the counter-engagement section 62 in order to move the overload protection mechanism 43' into the coupling position Z1. To move the overload protection mechanism 43' from the coupling position Z1 into the decoupling position Z2, the engagement section 74 is moved out of form-fitting engagement with the counter-engagement section 62. The engagement section 74 comprises two control surfaces 75, 76 (FIG. 12).

As FIG. 12 shows, depending on the direction of rotation of the drive shaft 35 (not shown), a spring force F1 of the spring element 69 acts on one of the control surfaces 75, 76 of the engagement section 74 and one of the control surfaces 63, 64 of the counter-engagement sections 62. In the orientation in FIG. 12, the drive shaft 35 rotates counterclockwise. A normal force F2 acts perpendicular to the control surfaces 63, 75. A resulting force F3 acts perpendicular to the spring force F1. A friction force F4 acts parallel to the control surfaces 63, 75.

If the spray arm 17, in particular the cross-arm 18, becomes blocked, the control surfaces 63, 75 slide on one another with friction so that, as shown in FIG. 10, the engagement section 74, leaves the form-fitting engagement with the counter-engagement section 62. The engagement section 74 slides on the flattened area 65 of the inner contour 61. During this, the spring element 69 remains compressed. As soon as the engagement section 74 has slid over the flattened area 65, it comes into contact with the circular inner contour 61 whereby the spring element 69 is partially relaxed. This reduces the spring force F1. After one revolution of the drive shaft 35, the engagement section 74 snaps back into the counter-engagement section 62. As long as the spray arm 17 is blocked, the overload protection mechanism 43' moves from the coupling position Z1 into the decoupling position Z2 and back on each revolution of the drive shaft 35.

FIG. 13 shows a schematic diagram in which the motor current I of the drive system 19, 19' is plotted on the Y-axis of the drive element. The time t is plotted on the X-axis. As explained above, the overload protection mechanism 43, 43' is provided to protect the controlled spray arm 16 and/or the drive system 19, 19' from damage. In the event of the dishwasher load blocking the cross-arm 18 when the spray arm 17 is rotating, the overload protection mechanism 43, 43' trips when a certain force is exceeded. This force is inter alia influenced by the respective spring element 48, 69. However, the force or the torque required to trip the overload protection mechanism 43, 43' is determined not only by the spring force F1 but decisively by the respective angle, in which the control surfaces 57, 58, 60, 63, 64, 75, 76 are positioned and thus by the normal force F2. The force or torque for tripping the overload protection mechanism 43, 43' can be influenced by the choice of material and thereby by the coefficient of sliding friction.

The drive shaft 35 can then rotate through 360° and the overload protection mechanism 43, 43' autonomously moves from the decoupling position Z2 back to the coupling position Z1. As long as the dishwasher load continues to block the cross-arm 18, the overload protection mechanism 43, 43' continues to trip. Since this continuous load could overload the controlled spray arm 16 and/or degrade the washing result, it is desirable to make the user aware of the blockage. This can, for example, be done by monitoring the motor current I of the drive element.

Each time the overload protection mechanism 43, 43' trips, the detection system 15 can detect an increase 77 to 81 in the motor current I. FIG. 13 depicts five such increases 77 to 81. Once they occur regularly, the increases 77 to 81 can be taken to be indicative of a blockage of the cross-arm 18. For example, after five increases 77 to 81, it can be assumed that there is a permanent blockage of the spray arm 17.

For further procedure in the event of a blockage of the spray arm 17 or the cross-arm 18 being detected, the household dishwasher 1 can, for example, now be switched off. Optionally, it is additionally or alternatively possible for an error message to be displayed to the user. Furthermore, the user could be informed via SmartApp that there is a blockage of the cross-arm 18 which the user can correct. Furthermore, in the event of the actual drive system 19, 19' being damaged, a message can be output that customer service should be called. Alternatively, the household dishwasher 1 can also continue to run without any action from the outside. However, this could result in a poorer cleaning result.

Although the present invention was described with reference to exemplary embodiments, it can be modified in many ways.

The invention claimed is:

1. A household dishwasher, comprising:
a washing container receiving a dishwasher load;
a spray arm for applying washing liquor and/or fresh water to the dishwasher load;
a drive system for actively driving the spray arm; and
an overload protection mechanism configured to move autonomously from a coupling position, in which power is transmitted between the drive system and the spray arm, into a decoupling position, in which the power transmission between the drive system and the spray arm is interrupted, when the spray arm becomes blocked.

2. The household dishwasher of claim 1, wherein the overload protection mechanism is spring-biased in a direction of the coupling position.

3. The household dishwasher of claim 1, wherein the drive system comprises a drive shaft mounted for rotation about an axis of rotation, said spray arm being mounted for rotation about an axis of rotation which is parallel to and spaced apart from the axis of rotation of the drive shaft.

4. The household dishwasher of claim 1, wherein the drive system comprises a gear wheel, said overload protection mechanism being received in the gear wheel of the drive system.

5. The household dishwasher of claim 4, wherein the overload protection mechanism comprises an overload element, which, for power transmission between the drive system and the spray arm, is engaged in a force-fitting manner and/or form-fitting manner with a counter-engagement section of the gear wheel, said overload element disengaging the force-fitting and/or form-fitting engagement with the counter-engagement section in order to move the overload protection mechanism from the coupling position into the decoupling position, when the spray arm becomes blocked.

6. The household dishwasher of claim 5, wherein the overload element moves linearly along an axis of rotation of the gear wheel in order to move the overload protection mechanism from the coupling position into the decoupling position, when the spray arm becomes blocked.

7. The household dishwasher of claim 6, wherein the overload protection mechanism comprises a housing element connected to the overload element, and further comprising a spring element arranged between the overload element and the housing element.

8. The household dishwasher of claim 7, wherein the spring element moves the overload element linearly along an axis of rotation of the gear wheel with respect to the housing element when the overload protection mechanism is moved from the coupling position into the decoupling position.

9. The household dishwasher of claim 7, wherein the spring element has at least one section which is received in the overload element.

10. The household dishwasher of claim 5, wherein the overload element moves linearly perpendicular to an axis of rotation of the gear wheel in order to move the overload protection mechanism from the coupling position into the decoupling position, when the spray arm becomes blocked.

11. The household dishwasher of claim 10, wherein the overload protection mechanism comprises a housing element received in the gear wheel, and further comprising a spring element arranged between the housing element and the overload element.

12. The household dishwasher of claim 11, wherein the spring element moves the overload element linearly perpendicular to the axis of rotation of the gear wheel with respect to the housing element, when the overload protection mechanism is moved from the coupling position into the decoupling position.

13. The household dishwasher of claim 11, wherein the overload element has at least one section which is received in the spring element.

14. The household dishwasher of claim 1, further comprising a detection system configured to detect whether the overload protection mechanism is in the coupling position or the decoupling position.

15. The household dishwasher of claim 14, wherein the detection system detects a motor current of the drive system.

16. A controlled spray arm for a household dishwasher having a wash container, comprising:
a spray arm for applying washing liquor and/or fresh water to a dishwasher load;
a drive system for actively driving the spray arm; and
an overload protection mechanism configured to move autonomously from a coupling position, in which power is transmitted between the drive system and the spray arm, into a decoupling position, in which the power transmission between the drive system and the spray arm is interrupted, when the spray arm becomes blocked.

17. The controlled spray arm of claim 16, wherein the overload protection mechanism is spring-biased in a direction of the coupling position.

18. The controlled spray arm of claim 16, wherein the drive system comprises a drive shaft mounted for rotation about an axis of rotation, said spray arm being mounted for rotation about an axis of rotation which is parallel to and spaced apart from the axis of rotation of the drive shaft.

19. The controlled spray arm of claim 16, wherein the drive system comprises a gear wheel, said overload protection mechanism being received in the gear wheel of the drive system.

20. The controlled spray arm of claim 19, wherein the overload protection mechanism comprises an overload element, which, for power transmission between the drive system and the spray arm, is engaged in a force-fitting manner and/or form-fitting manner with a counter-engagement section of the gear wheel, said overload element disengaging the force-fitting and/or form-fitting engagement with the counter-engagement section in order to move the overload protection mechanism from the coupling position into the decoupling position, when the spray arm becomes blocked.

21. The controlled spray arm of claim 20, wherein the overload element moves linearly along an axis of rotation of the gear wheel in order to move the overload protection mechanism from the coupling position into the decoupling position, when the spray arm becomes blocked.

22. The controlled spray arm of claim 21, wherein the overload protection mechanism comprises a housing element connected to the overload element, and further comprising a spring element arranged between the overload element and the housing element.

23. The controlled spray arm of claim 22, wherein the spring element moves the overload element linearly along an axis of rotation of the gear wheel with respect to the housing element when the overload protection mechanism is moved from the coupling position into the decoupling position.

24. The controlled spray arm of claim 22, wherein the spring element has at least one section which is received in the overload element.

25. The controlled spray arm of claim 20, wherein the overload element moves linearly perpendicular to an axis of rotation of the gear wheel in order to move the overload protection mechanism from the coupling position into the decoupling position, when the spray arm becomes blocked.

26. The controlled spray arm of claim 25, wherein the overload protection mechanism comprises a housing element received in the gear wheel, and further comprising a spring element arranged between the housing element and the overload element.

27. The controlled spray arm of claim 26, wherein the spring element moves the overload element linearly perpendicular to the axis of rotation of the gear wheel with respect to the housing element, when the overload protection mechanism is moved from the coupling position into the decoupling position.

28. The controlled spray arm of claim 26, wherein the overload element has at least one section which is received in the spring element.

29. The controlled spray arm of claim 16, further comprising a detection system configured to detect whether the overload protection mechanism is in the coupling position or the decoupling position.

30. The controlled spray arm of claim 29, wherein the detection system detects a motor current of the drive system.

* * * * *